US006785847B1

(12) United States Patent
Jordan et al.

(10) Patent No.: US 6,785,847 B1
(45) Date of Patent: Aug. 31, 2004

(54) SOFT ERROR DETECTION IN HIGH SPEED MICROPROCESSORS

(75) Inventors: Paul J. Jordan, Austin, TX (US); Peter J. Klim, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 09/631,714

(22) Filed: Aug. 3, 2000

(51) Int. Cl.[7] .............................................. G06F 11/00
(52) U.S. Cl. .......................... 714/37; 714/42; 714/49; 714/54; 714/819; 712/221
(58) Field of Search ............................. 714/37, 42, 49, 714/54, 819; 712/23, 221, 222

(56) References Cited

U.S. PATENT DOCUMENTS

| | | | | |
|---|---|---|---|---|
| 5,125,094 A | * | 6/1992 | Kyuma | 712/221 |
| 5,638,526 A | * | 6/1997 | Nakada | 712/218 |
| 5,764,943 A | * | 6/1998 | Wechsler | 712/218 |
| 5,790,826 A | * | 8/1998 | Thusoo et al. | 712/216 |
| 6,263,424 B1 | * | 7/2001 | Tran et al. | 712/221 |
| 6,658,621 B1 | * | 12/2003 | Jamil et al. | 714/805 |
| 2001/0034854 A1 | * | 10/2001 | Mukherjee | 714/5 |

OTHER PUBLICATIONS

1999 IEEE International Solid–State Circuits Conference, MP 5.2 600MHz G5 S/390 Microprocessor, 2 pages.

* cited by examiner

Primary Examiner—Scott Baderman
(74) Attorney, Agent, or Firm—Anthony V. S. England; Casimer K. Salys

(57) ABSTRACT

Aspects for soft error detection for a superscalar microprocessor are described. The aspects include a first pipeline, the first pipeline including a first arithmetic logic unit, ALU, comparator and a first general purpose register, GPR, for storing first data, and a second pipeline, the second pipeline including a second GPR and a second ALU comparator, the second GPR for storing second data, the second data being a copy of the first data. A detection system utilizes one of the first and second ALU comparators to perform a comparison of the second data with the first data during an idle state of the first and second pipelines.

20 Claims, 4 Drawing Sheets

SOFT ERROR DETECTION IN HIGH SPEED MICROPROCESSORS

FIELD OF THE INVENTION

The present invention relates to soft errors in high speed microprocessors.

BACKGROUND OF THE INVENTION

Soft errors due to alpha particle radiation are commonplace in integrated circuits, particularly in latches and memory elements. This source is not limited to cosmic rays. On-chip solder bumps produce alpha particles themselves, as they contain lead. Hence, storage nodes are subjected to more probable single event upsets (soft errors) due to alpha particles than in the past. This may cause the storage node to flip and lose its contents.

A block diagram of a GPR (general purpose register) 10 is illustrated in FIG. 1. Signals rd0_data<0:63> through rd3_data<0:63> are the 64 bit read data outputs of port 0 through port 3, respectively. Corresponding read addresses are rd0_addr<0:6> through rd3_addr<0:6>; they support an address range from 0 to 127. In this example, only entries corresponding to addresses 0 to 79 exist; addresses 80 through 127 do not exist and cannot be read or written. Signals wr0_data<0:63> through wr4_data<0:63> indicate 64 bit write data inputs for ports 0 through 4, respectively. Similar to the read ports, wr0_addr<0:6> through wr4_addr<0:6> represent 7-bit wide addressing for corresponding write ports 0 through 4.

One method for detecting soft errors is to add a parity bit to each of the GPR entries. FIG. 2 illustrates a GPR 10 showing the bit positions of the entries 12 along with a parity bit 14. With the GPR 10 having 4 read and 5 write ports, nine 64-way exclusive OR (XOR) circuits are required for parity generation. Furthermore, the parity generation may not be accomplished in the same clock cycle and would have to be delayed by one clock cycle. These constraints are often not acceptable for some systems to detect soft errors.

Now, taking as an example, a Power 4 superscalar microprocessor chip from IBM Corporation, Armonk, N.Y., where there are two Fixed Point Unit (FXU) pipelines, a GPR must provide five write and eight read ports. Arrays and register files are commonly replicated in high frequency, superscalar microprocessor design to satisfy the required number of read ports without affecting cycle time. Thus, to avoid the complexity of an eight read port memory cell, it is commonplace that each FXU pipeline has its own four read and five write port GPR file. FIG. 3 illustrates FXU pipelines 16 and 18, each having a four read and five write port GPR file 20, 22. Both GPRs 20 and 22 must hold identical data for the superscalar design to satisfy the architecture and the programming model. In practice, this copying of data is achieved with a delay of one clock cycle, and the basic mechanism for the transfer of data from FXU pipeline0 16 to FXU pipeline1 18 and FXU pipeline1 18 to FXU pipeline0 16 is illustrated in FIG. 3. As shown in FIG. 3, if an adder 24 in FXU pipeline0 16 writes to write port 0 of the GPR 20 in FXU pipeline0 16, the write data is transmitted to FXU pipeline1 18 through latch 26 (LATCH_0_TO_1<0:63>, indicating one latch for each data bit). The latch 26 introduces one clock cycle delay for this operation. In this example, master slave latches are deployed. These are clocked with non-overlapping LSSD (Level sensitive scan design) clocks, cclk and bclk. It should be noted that any other clocking scheme would work as well. A similar operation may also be observed in FIG. 3, where the multiplier 28 in FXU pipeline1 18 writes to write port 4 and then sends data to FXU pipeline0 16 through latch 30 (LATCH_1_TO_0<0:63>). This connection of execution engine (adder 24, multiplier 28) to the register file is merely representative for the connections within any superscalar processor, and the details will vary across implementations.

Taking advantage of the fact that the GPRs must contain identical data by one clock cycle delayed, a fifth read port 31 may be added to each register file 20' and 22', as shown in FIG. 4. The data outputs of the fifth read ports 31 may be fed to a comparator 32, as depicted in FIG. 4, in order to determine data integrity. The comparator 32 issues a machine_check signal if a difference in the content of the two GPRs 20' and 22' exists. A fifth read port, however, increases the design complexity, as well as the cell size. In addition, a 64-bit comparator must be added.

Accordingly, what is needed is a mechanism that allows detection of soft errors in replicated arrays and register files. The present invention addresses such a need.

SUMMARY OF THE INVENTION

The present invention provides aspects for soft error detection for a superscalar microprocessor. The aspects include a first pipeline, the first pipeline including a first arithmetic logic unit, ALU, comparator and a first general purpose register, GPR, for storing first data, and a second pipeline, the second pipeline including a second GPR and a second ALU comparator, the second GPR for storing second data, the second data being a copy of the first data. A detection system utilizes one of the first and second ALU comparators to perform a comparison of the second data with the first data during an idle state of the first and second pipelines.

Through the present invention, soft error detection occurs in a manner that overcomes deficiencies with prior art approaches. The present invention provides soft error detection efficiently by taking advantage of an existing data transfer mechanism and a 64-bit comparator already in the ALU of FXU pipelines. These and other advantages of the aspects of the present invention will be more fully understood in conjunction with the following detailed description and accompanying drawings.

DETAILED DESCRIPTION OF THE INVENTION

The present invention relates to soft error detection in high speed microprocessors. The following description is presented to enable one of ordinary skill in the art to make and use the invention and is provided in the context of a patent application and its requirements. Thus, the present invention is not intended to be limited to the embodiment shown, but is to be accorded the widest scope consistent with the principles and features described herein.

Figure 1:
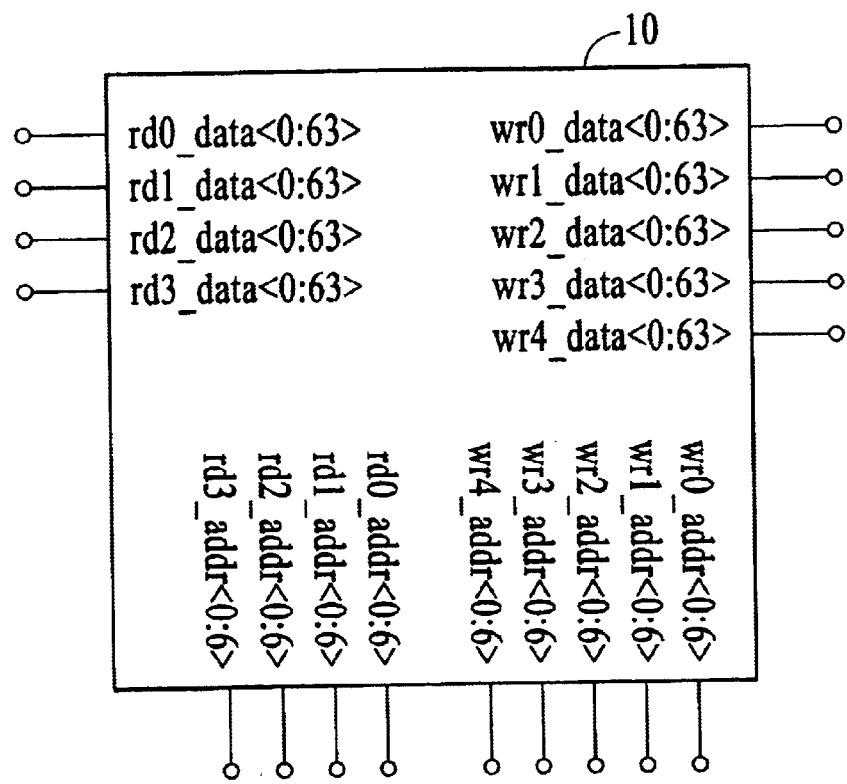
FIG. 1 illustrates a block diagram of a typical GPR.
Figure 2:
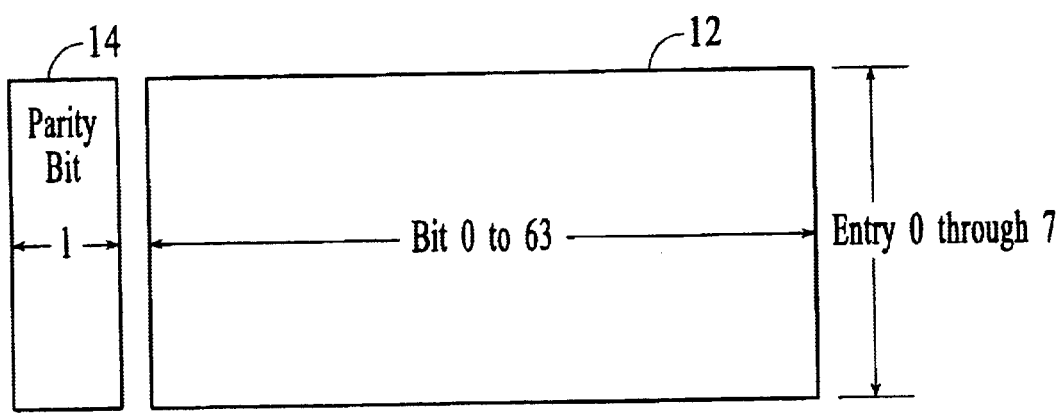
FIG. 2 illustrates a prior art GPR with parity for soft error detection.
Figure 3:
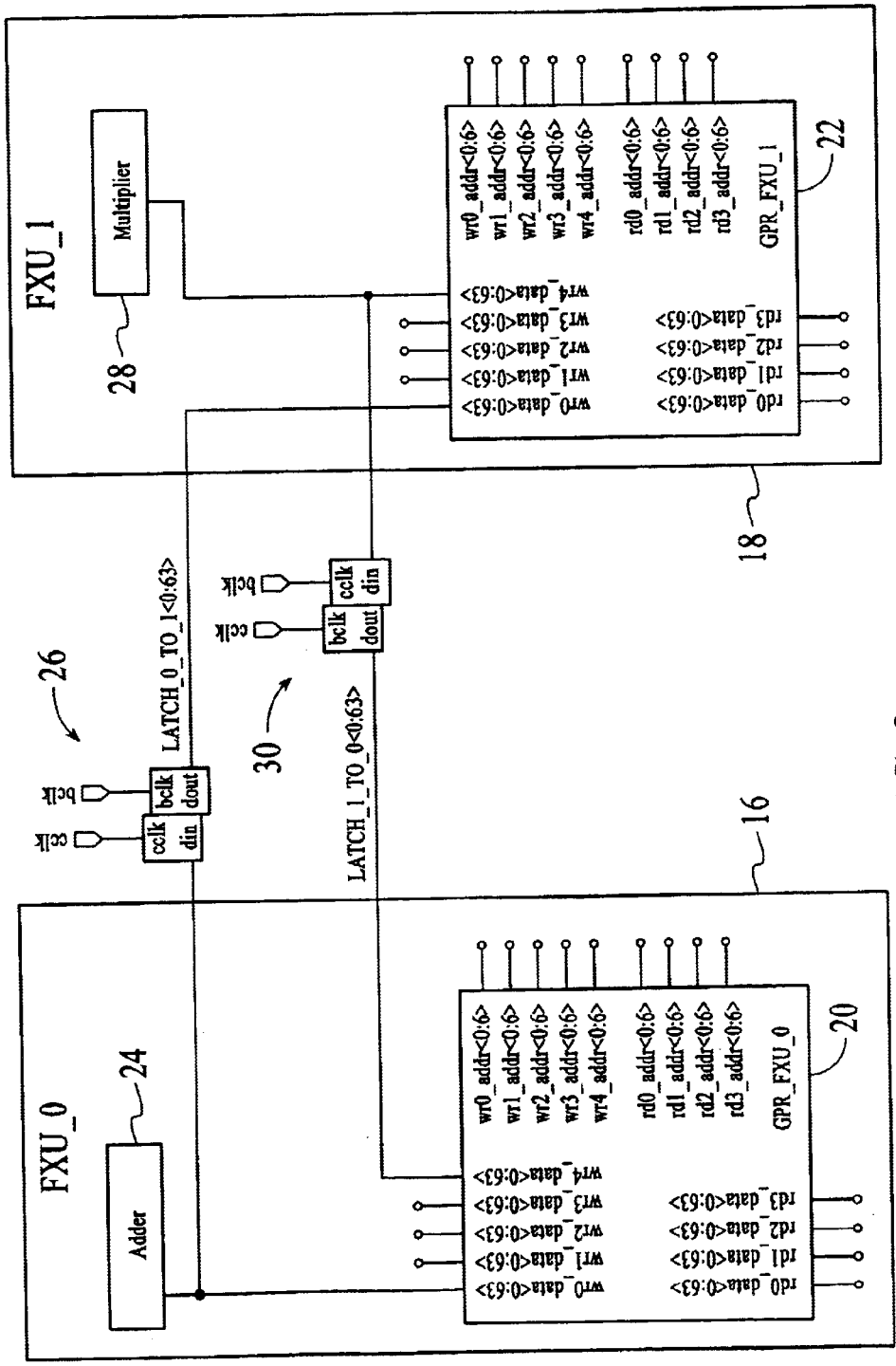
FIG. 3 illustrates a prior art FXU pipeline.
Figure 4:
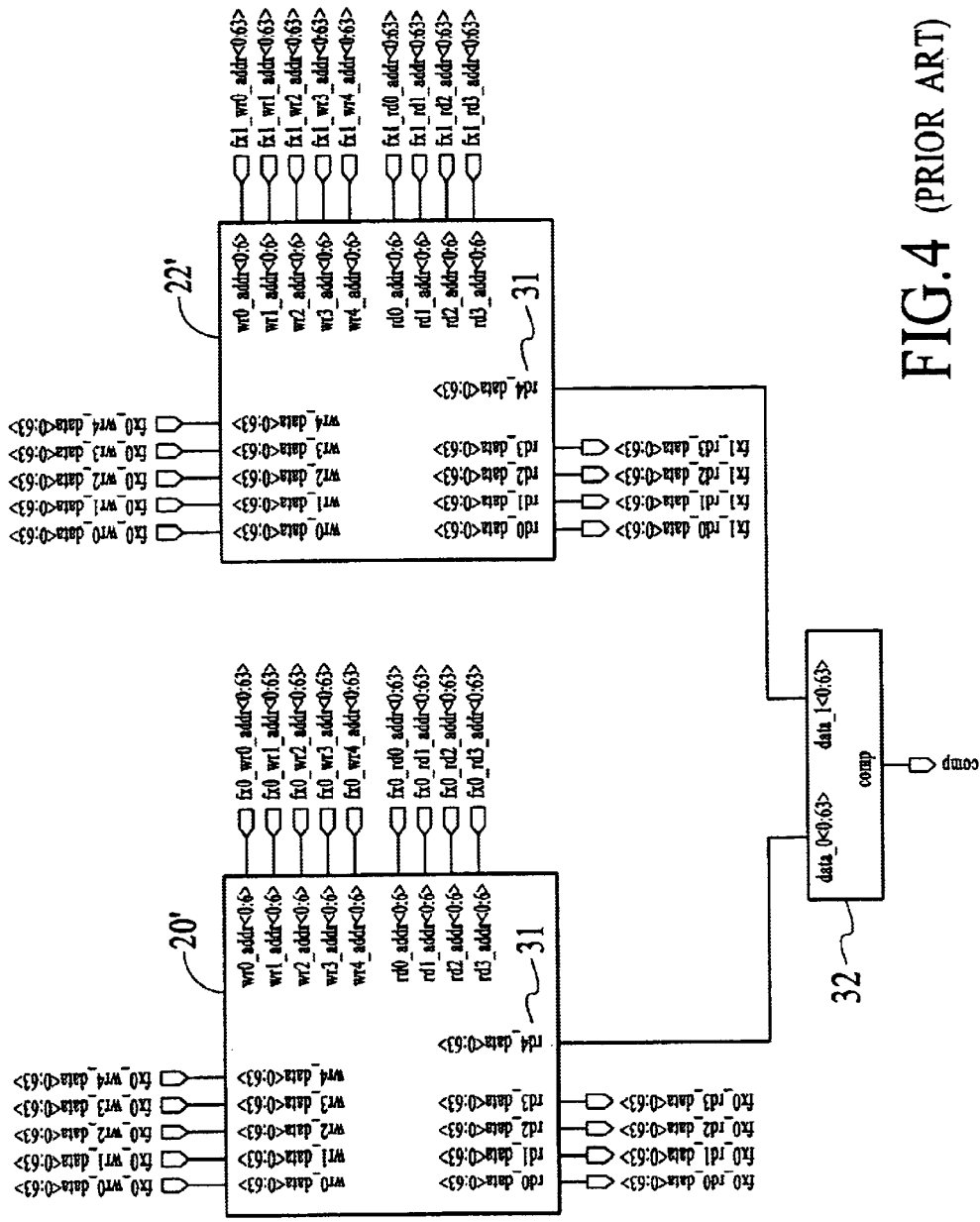
FIG. 4 illustrates a prior art soft error detection system.
Figure 5:
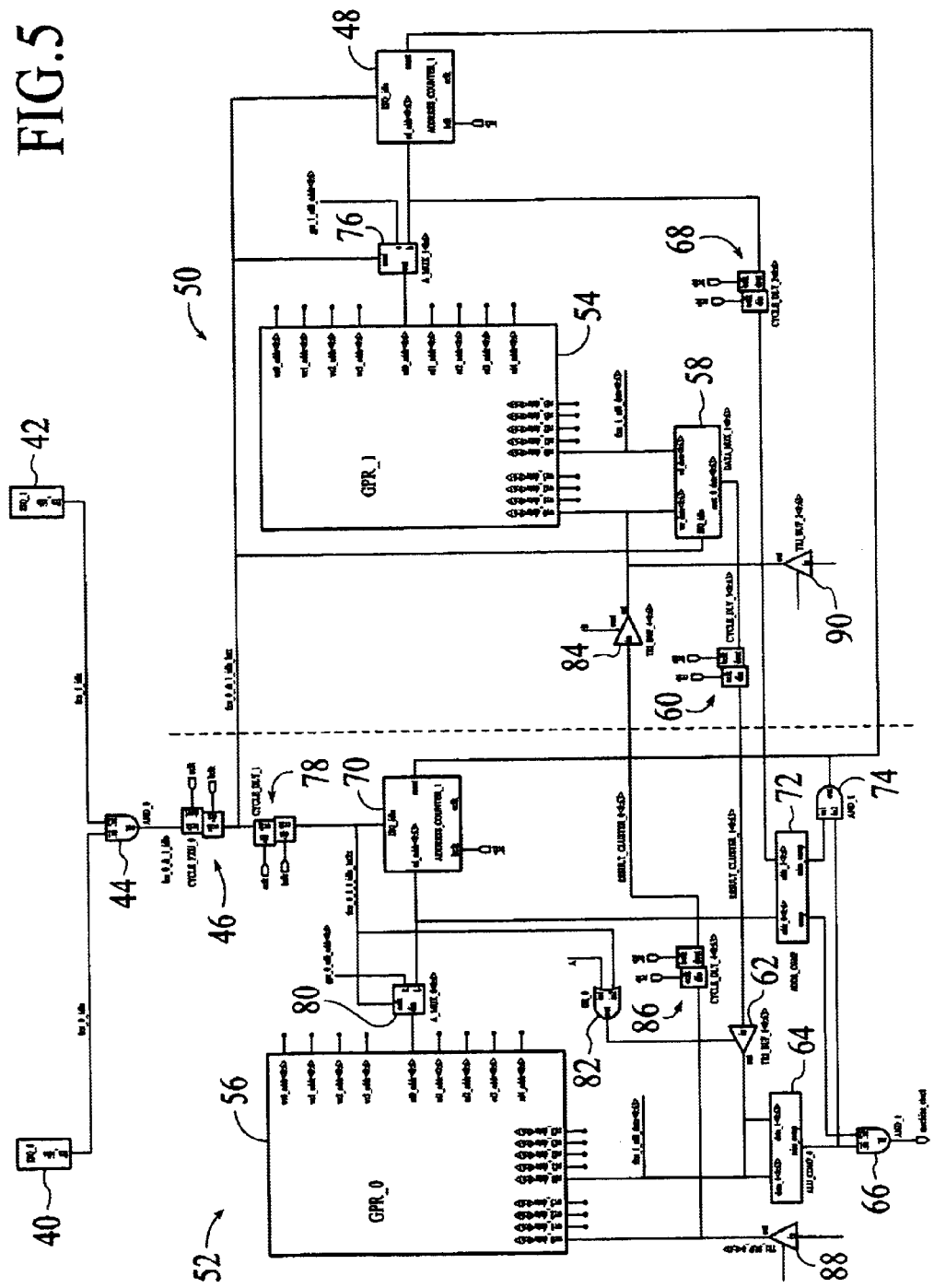
FIG. 5 illustrates a soft error detection system in accordance with the present invention.

The depiction in FIG. 5 shows a complete soft error detection system in accordance with a preferred embodiment. Since the invention only requires one 64-bit comparator, the following describes implementation utilizing the comparator in the ALU (arithmetic logic unit) of FXU pipeline0 of a Power 4 microprocessor. Of course, the ALU in FXU pipeline1 could be utilized instead, as both FXUs are identical. Further, connections not made to the GPRs are omitted for illustration purposes.

In operation, when an instruction sequencing unit (ISU) does not have immediate instructions for the FXU, the FXU is idle. The signalling of an FXU idle condition occurs via an ISQ_0 (issue queue 0) 40 and ISQ_1 (issue queue 1) 42, which issue the signal fxu_0_idle and fxu_1_idle, respectively. In order for the soft error detection system to begin operation, both FXUs must be idle. Therefore, logically combining the fxu_0_idle and fxu_1_idle signals via an AND gate 44 (AND _0) establishes the condition that both FXU pipelines are idle. Since it takes one cycle for both GPRs to be coherent, a master-slave latch 46 delays fxu_0_&_1_idle from AND gate 44 by one cycle.

To serve as an example of the soft error detection system operation, both ISQs 40 and 42 are assumed to have issued their respective fxu idle signals, and a read address from ADDRESS_COUNTER_1 48 (in FXU pipeline1 50) has also issued. One clock cycle later, the read address in FXU pipeline0 52 is issued. The output rd0_data<0:63> becomes valid after the normal access time of GPR_1 54 and likewise the read data of GPR_0 56 a clock cycle later. DATA_MUX_1<0:63> 58 steers the read data to latch 60, CYCLE_DLY_3<0:63>, where it is delayed by a clock cycle and transmitted to FXU pipeline0 52 as result_cluster_1<0:63>. Tri-state buffer 62, TRI_BUF_1<0:63>, is turned on as described below. Notice that data from FXU pipeline1 50 and control signals from FXU pipeline0 52 are now synchronized to the same clock cycle. The output of TRI_BUF_1<0:63> 62 is connected to 64-bit comparator 64, ALU_COMP_0. The other input to ALU_COMP_0 64 comes as rd0_data<0:63> from GPR_0 56 and has the same clock phase as result_cluster_1<0:63>. If there is a mismatch, in2 input of AND gate 66, AND_1, goes high.

In order to ensure that read data from GPR_0 56 and GPR_1 54 come from the same entry, the two address counter outputs must be compared. Latch 68, CYCLE_DLY_2<0:6>, delays the output of ADDRESS_COUNTER_1 48 by a clock cycle such that it may be compared with the output from ADDRESS_COUNTER_0 70. The comparison is handled by a seven-bit comparator 72, ADDR_COMP, whose output is connected to input in1 of AND_1 66. The comparator 72 output goes high if the two addresses are the same. If a miscompare from the ALU_COMP_0 64 is present at the in2 input of AND_1 66, machine_check goes high indicating a mismatch in the two GPRs. Should a data miscompare occur and a mismatch in the counter addresses occur as well, then the signal counter reset is issued by AND gate 74, AND_2, to reset both counters 48 and 70. Preferably, part of the recovery routine is to only allow a certain number of counter miscompares before issuing a machine check.

Further included in the soft error detection system are several other components that ensure proper operation. The output signal, fxu_0_&_1_idle_lat, of latch 46 (CYCLE_DLY_0), is directly connected to: the enable pin (ISQ_idle) of ADDRESS_COUNTER_1 48; a multiplexor 76 (A_MUX_1) in FXU pipeline1 50; and the data multiplexor 58 DATA_MUX_1<0:63>. Since the comparator 64 in the ALU in FXU pipeline0 52 is used, and the data transferred from FXU pipeline1 50 to FXU pipeline0 52 is one clock cycle delayed, fxu_0_&_1_idle_lat is delayed an additional clock cycle by latch 78 (CYCLE_DLY_1). The output signal, fxu_0_&_1_idle_lat2x, of latch 78 is connected to: ADDRESS_COUNTER_0 70; multiplexor 80 (A_MUX_0<0:6>); and OR gate 82, OR_0, in FXU pipeline0 52. The signals fxu_0_&_1_idle_lat_2x and fxu_0_&_1_idle_lat serve as enable signals for the two address counters, ADDRESS_COUNTER_0 70 and ADDRESS_COUNTER_1 48, respectively, as well as control signals for A_MUX_0<0:6> 80 and A_MUX_1<0:6> 76, respectively. The two address counters 48 and 70 continue sequencing (any desired sequence) with every clock as long as the idle signals are active. The control inputs for the two multiplexors 76 and 80 steer the 7-bit counter outputs onto the corresponding rd0_addr<0:6>, blocking the system read addresses to port 0, gpr_0_$_{rd0}$_addr<0:6> and gpr_1_rd0_addr<0:6>, respectively. Port 0 was chosen in this example, but any other read port could have been used as well.

OR_0 82 receives fxu_0_&_1_idle_lat_2x, and a signal "A", which represents the normal system tri-state control signal for tri-state buffer 62, TRI_BUF_1. "A" is inactive when FXU pipeline0 52 is idle, and fxu_0_&_1_idle_lat_2x active turns on TRI_BUF_1<0:63> 62 to steer data from FXU pipeline1 50 (result_cluster_1<0:63>) onto the indicated port 0 write data bus in FXU pipeline0 52 (wr0_data<0:63>). Again, it should be noted that any other write port could have served in this capacity. A tri-state buffer 84 (TRI_BUF_4<0:63>, equivalent of TRI_BUF_1<0:63> 62 in FXU pipeline0 52) is controlled directly by a normal operation signal "B." Latch 68 (CYCLE_DLY_2<0:63>) and latch 86 (CYCLE_DLY_4<0:63>) indicate that there is one clock cycle delay between both pipelines 50 and 52 during write data transfer.

Tri-state buffers 88 and 90, TRI_BUF_0<0:63> and TRI_BUF_2<0:63>, are shown to illustrate connections to their system devices, such as ALU, Rotator, Load Store Unit (LSU), etc. The branches for signals fxu_rd_0_data<0:63> and fxu_rd_1_data<0:63> are included for the same purpose.

Thus, the present invention provides an efficient solution for soft error detection. In accordance with the present invention, soft error detection occurs in a manner that does not need a fifth read port, takes advantage of the existing data transfer mechanism, and furthermore, is able to utilize the 64-bit comparator already in the ALU of FXU pipelines.

Although the present invention has been described in accordance with the embodiments shown, one of ordinary skill in the art will readily recognize that there could be variations to the embodiments and those variations would be within the spirit and scope of the present invention. For example, the above description shows one implementation for comparing the contents of two GPRs. A number of other implementations are possible, some of which will take advantage of available instructions rather than hardware control. Note that failing addresses could be stored into specialized error detection and correction logic. Also note that those skilled in microprocessor design could adapt this implementation to further use existing dataflow paths between the pipelines. Accordingly, many modifications may be made by one of ordinary skill in the art without departing from the spirit and scope of the appended claims.

What is claimed is:

1. A soft error detection system for a superscalar microprocessor comprising:

a first pipeline, the first pipeline including a first arithmetic logic unit, ALU, comparator and a first general purpose register, GPR, for storing first data;

a second pipeline, the second pipeline including a second GPR and a second ALU comparator, the second GPR for storing second data, the second data being a copy of the first data; and a detection system utilizing one of the first and second ALU comparators to perform a comparison of the second data with the first data during an idle state of the first and second pipelines.

2. The system of claim 1 wherein the first pipeline further comprises a first issue queue for issuing an idle signal for the first pipeline.

3. The system of claim 2 wherein the second pipeline further comprises a second issue queue for issuing an idle signal for the second pipeline.

4. The system of claim 3 wherein the detection system determines the idle state exists according to the idle signals of the first and second issue queues.

5. The system of claim 1 wherein the detection system further comprises a plurality of logic elements for ensuring coherency between the first and second pipelines.

6. The system of claim 5 wherein the plurality of logic elements ensure that the first data from the first pipeline is synchronized to a same clock as control signals of the second pipeline.

7. The system of claim 5 wherein the plurality of logic elements further comprise a comparator for comparing address signals of the first and second pipelines to ensure that the first and second data come from same entries.

8. The system of claim 1 wherein the first pipeline further comprises a first fixed point unit, FXU, pipeline.

9. The system of claim 8 wherein the second pipeline further comprises a second FXU pipeline.

10. A method for detecting soft errors in superscalar microprocessors, the method comprising:

utilizing duplicated register files to store data in first and second pipelines of a processor; and comparing data from a same entry in the duplicated register files with an arithmetic logic unit of one of the first and second pipelines to detect a soft error in the duplicated register files.

11. The method of claim 10 further comprising performing the step of comparing during an idle state of both of the first and second pipelines.

12. The method of claim 11 further comprising utilizing issue queue signals to determine the idle state.

13. The method of claim 10 wherein utilizing duplicated register files further comprises utilizing duplicated general purpose registers of first and second fixed point unit pipelines.

14. The method of claim 10 further comprising synchronizing control signals of one of the first and second pipelines with data read from another of the first and second pipelines.

15. The method of claim 14 further comprising utilizing a plurality of logic elements, including latches, to perform the step of synchronizing.

16. A method for soft error detection in a high frequency superscalar microprocessor, the method comprising:

determining an idle state condition in first and second fixed point unit pipelines;

reading data from a first general purpose register of the first fixed point unit pipeline; and comparing the read data with corresponding duplicate data in a second general purpose register of the second fixed point unit pipeline with an arithmetic logic unit of the second fixed point unit pipeline.

17. The method of claim 16 further comprising detecting a soft error when the read data does not match the corresponding duplicate data.

18. The method of claim 16 wherein detecting an idle state condition further comprises identifying an idle signal from first and second issue queues associated with the first and second fixed point unit pipelines.

19. The method of claim 16 further comprising synchronizing the read data with control signals of the second fixed point unit.

20. The method of claim 16 further comprising comparing entry addresses of the read data and the corresponding duplicate data to ensure a same entry is being compared.

* * * * *